(12) United States Patent
Zhao et al.

(10) Patent No.: US 12,144,002 B2
(45) Date of Patent: Nov. 12, 2024

(54) METHOD, DEVICE, AND STORAGE MEDIUM FOR INSTRUCTING MINIMUM SCHEDULING OFFSET

(71) Applicant: Spreadtrum Communications (Shanghai) Co., Ltd., Shanghai (CN)

(72) Inventors: Sicong Zhao, Shanghai (CN); Huayu Zhou, Shanghai (CN); Reven Lei, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 333 days.

(21) Appl. No.: 17/672,179

(22) Filed: Feb. 15, 2022

(65) Prior Publication Data
US 2022/0174718 A1 Jun. 2, 2022

Related U.S. Application Data

(63) Continuation of application No. PCT/CN2020/109110, filed on Aug. 14, 2020.

(30) Foreign Application Priority Data
Aug. 16, 2019 (CN) .......................... 201910757104.X

(51) Int. Cl.
*H04W 72/23* (2023.01)
*H04W 76/28* (2018.01)

(52) U.S. Cl.
CPC ........... *H04W 72/23* (2023.01); *H04W 76/28* (2018.02)

(58) Field of Classification Search
None
See application file for complete search history.

(56) References Cited

U.S. PATENT DOCUMENTS

2019/0132109 A1 5/2019 Zhou et al.
2020/0107345 A1* 4/2020 Ang ...................... H04L 1/0026
(Continued)

FOREIGN PATENT DOCUMENTS

CN 107371265 A 11/2017
CN 109040151 A 12/2018
(Continued)

OTHER PUBLICATIONS

PCT International Search Report and Written Opinion mailed Oct. 28, 2020 issued in corresponding International Application No. PCT/CN2020/109110 (7 pgs.).
(Continued)

*Primary Examiner* — Christopher T Wyllie
(74) *Attorney, Agent, or Firm* — Finnegan, Henderson, Farabow, Garrett & Dunner, LLP

(57) ABSTRACT

This disclosure relates to a method, a device, and a storage medium for instructing a minimum scheduling offset. The method for instructing the minimum scheduling offset is applied in terminal equipment and includes: in a switch back period, receiving a minimum scheduling offset switching indication, the minimum scheduling offset switching indication to instruct switching the minimum scheduling offset from a first minimum value to a second minimum value; and causing the minimum scheduling offset to switch back to a third minimum value in another switch back period after the switch back period.

19 Claims, 12 Drawing Sheets

(56) References Cited

U.S. PATENT DOCUMENTS

| | | | |
|---|---|---|---|
| 2020/0229104 A1* | 7/2020 | MolavianJazi | H04W 52/146 |
| 2020/0374918 A1* | 11/2020 | Ang | H04W 72/23 |
| 2022/0104122 A1* | 3/2022 | Maleki | H04W 52/0232 |
| 2022/0174718 A1* | 6/2022 | Zhao | H04W 76/28 |
| 2022/0232611 A1* | 7/2022 | Hakola | H04W 52/0229 |

FOREIGN PATENT DOCUMENTS

| | | |
|---|---|---|
| CN | 109586877 A | 4/2019 |
| CN | 110351871 A | 10/2019 |

OTHER PUBLICATIONS

Spreadtrum Communications, "3GPP TSG RAN WG1 Meeting #97 R1-1906372", Discussion on cross-slot scheduling for UE power saving, May 13, 2019.

Huawei et al., "3GPP TSG RAN WG1 #97 R1-1906006", Procedure of cross-slot scheduling for UE power saving, May 13, 2019.

Spreadtrum Communications, "3GPP TSG RAN WG1 Meeting #96b R1-1904803", Discussion on cross-slot scheduling for UE power saving, Apr. 8, 2019.

Interdigital, Inc., "3GPP TSG RAN WG1 Meeting #97 R1-1907105", On cross-slot scheduling for UE power saving, May 13, 2019.

* cited by examiner

METHOD, DEVICE, AND STORAGE MEDIUM FOR INSTRUCTING MINIMUM SCHEDULING OFFSET

CROSS-REFERENCE TO RELATED APPLICATIONS

The present application is a continuation of International Application No. PCT/CN2020/109110, filed on Aug. 14, 2020, entitled "METHOD AND DEVICE USED TO INDICATE minimum SCHEDULING DELAY, AND STORAGE MEDIUM," which claims priority to Chinese Patent Application Serial No. 201910757104.X, filed on Aug. 16, 2019, entitled "METHOD AND DEVICE USED TO INDICATE MINIMUM SCHEDULING DELAY, AND STORAGE MEDIUM," both of which are incorporated herein by reference in their entireties.

TECHNICAL FIELD

This disclosure relates to the field of communication technology and in particular to a method, a device, and a storage medium for instructing a minimum scheduling offset.

BACKGROUND

Scheduling offset is the slot interval between a physical downlink control channel (PDCCH) and a physical downlink shared channel (PDSCH). The PDCCH is used for transmitting downlink control information (DCI), and the PDSCH is used for transmitting downlink data.

In relevant technology, one example is the switching from cross-slot scheduling to same-slot scheduling by using downlink control information. In such switching, access network equipment sends a switching indication to terminal equipment, which, upon receiving the switching indication, switches a minimum applicable scheduling offset from its current greater-than-zero value to zero, causing the terminal equipment to cache the PDSCH of a current slot, thereby implementing data scheduling from the access network equipment to the terminal equipment.

However, in the method above, if the switching indication is not detected by the terminal equipment, in other words, the terminal equipment does not receive the switching indication, then the terminal equipment determines that the current minimum scheduling offset is still a value greater than zero and therefore does not cache the PDSCH of the current slot. This will result in failed scheduling of the terminal equipment, thus affecting the throughput performance of the system.

SUMMARY

This disclosure provides a method, a device, and a storage medium for instructing a minimum scheduling offset.

In some embodiments of the present disclosure, a method, applied in terminal equipment, for instructing a minimum scheduling offset includes: in a switch back period, receiving a minimum scheduling offset switching indication, the minimum scheduling offset switching indication to instruct switching the minimum scheduling offset from a first minimum value to a second minimum value; and causing the minimum scheduling offset to switch back to a third minimum value in another switch back period after the switch back period.

In some embodiments of the present disclosure, a method, applied in access network equipment, for instructing a minimum scheduling offset includes: in a switch back period, sending a minimum scheduling offset switching indication, the minimum scheduling offset switching indication to instruct a terminal equipment to switch the minimum scheduling offset from a first minimum value to a second minimum value; and causing the minimum scheduling offset to switch back to a third minimum value in another switch back period after the switch back period.

In some embodiments of the present disclosure, a device, applied in terminal equipment, for instructing a minimum scheduling offset includes: a receiver configured to receive a minimum scheduling offset switching indication in a switch back period, the minimum scheduling offset switching indication to instruct switching the minimum scheduling offset from a first minimum value to a second minimum value; and a processor configured to cause the minimum scheduling offset to switch back to a third minimum value in another switch back period after the switch back period.

In some embodiments of the present disclosure, a device, applied in access network equipment, for instructing a minimum scheduling offset includes: a transmitter configured to send a minimum scheduling offset switching indication in a switch back period, the minimum scheduling offset switching indication to instruct terminal equipment to switch a minimum scheduling offset from a first minimum value to a second minimum value; and a processor configured to cause the minimum scheduling offset to switch back to a third minimum value in another switch back period after the switch back period.

In some embodiments of the present disclosure, terminal equipment includes: a processor; and a memory device configured to store instructions executable by the processor. The processor is configured to execute the instructions to: receive a minimum scheduling offset switching indication in a switch back period, the minimum scheduling offset switching indication to instruct switching a minimum scheduling offset from a first minimum value to a second minimum value; and cause the minimum scheduling offset to switch back to a third minimum value in another switch back period after the switch back period.

In some embodiments of the present disclosure, an access network equipment includes a processor; and a memory device configured to store instructions executable by the processor. The processor is configured to execute the instructions to: send a minimum scheduling offset switching indication in a switch back period, the minimum scheduling offset switching indication to instruct the terminal equipment to switch a minimum scheduling offset from a first minimum value to a second minimum value; and cause the minimum scheduling offset to switch back to a third minimum value in another switch back period after the switch back period.

In some embodiments of the present disclosure, a non-volatile computer readable storage medium stores a set of computer program instructions executable by a processor. The set of computer program instructions, when executed by the processor, implements the aforementioned methods.

Other features and aspects of the disclosure will be made clearer by the following detailed description of exemplary embodiments in reference to the drawings.

BRIEF DESCRIPTION OF THE DRAWINGS

Drawings contained in the Description and constituting a part of the Description, together with the Description, show exemplary embodiments, features, and aspects of the disclosure and are used for explaining principles in the disclosure.

DETAILED DESCRIPTION

Figure 1:
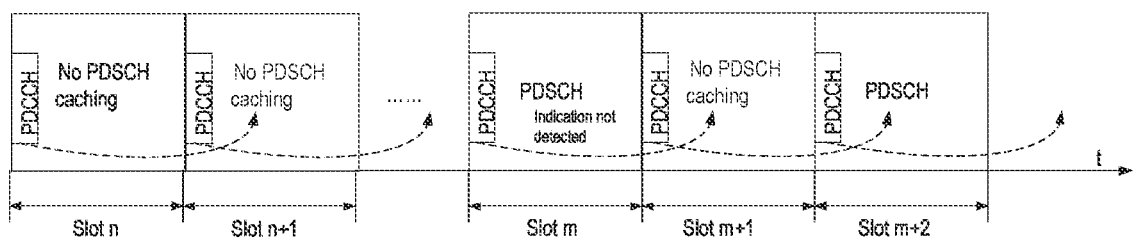
FIG. 1 is a schematic diagram illustrating minimum scheduling offset switching, according to relevant technology.

Exemplary embodiments, features, and aspects of the disclosure will be described below in detail in reference to the drawings. Identical markings in the drawings indicate elements that have the same or similar functions. Although the drawings illustrate various aspects of the embodiments, the drawings are not necessarily created in proportion unless specifically indicated so.

The specific term "exemplary" in this document means "being used as an example or embodiment, or illustrative." In this document, any embodiment that is described as "exemplary" is not necessarily interpreted as being superior or better than other embodiments.

It should be understood that the term "and/or" in this document simply describes the relationship between related subjects; this term indicates three possible relationships. For example, "A and/or B" may indicate: A alone, A and B, or B alone. Additionally, the symbol "/" in this document indicates an "or" relationship between the related subjects that precede and follow it, respectively.

In the embodiments in the disclosure, "plurality" refers to two or more than two.

"First," "second," and similar descriptions in the embodiments in the disclosure are used only for the purposes of illustration and distinguishing subjects being described. These expressions neither assign any order nor specifically limit the number of equipment in the embodiments in the disclosure; they cannot constitute any limitation on the embodiments in the disclosure.

"Connection/connected" in the embodiments in the disclosure refers to a direct or indirect connection by various means to implement communication between equipment; the embodiments in the disclosure do not impose any limitation in this respect.

Additionally, many specific details are provided in the detailed description below to better describe the disclosure. Persons of ordinary skill in the art should understand that the disclosure may be implemented even without certain specific details. In some embodiments, no detailed description is provided on methods, means, elements, and circuits that are well known to persons of ordinary skill in the art so as to stay focused on the theme of the disclosure.

Battery life is an important measurement of terminal equipment performance. Therefore, many technical features have been introduced in 5G systems to indicate changes of the terminal equipment's behavior, so the terminal equipment may, under proper conditions, enter a power saving state to save power for the terminal equipment. Such switching of state involves changes of a plurality of configurations, such as switching of bandwidth part (BWP), switching of PDCCH detection cycle, configurations of PDCCH skipping, and cross-slot scheduling with a minimum scheduling offset K0min greater than 0. Using downlink control information to carry signaling that triggers these configuration changes has gained increasing support and now is a potential direction for technological standardization.

In cross-slot scheduling, the downlink control information is received in a slot different from the slot in which the PDSCH scheduled by this downlink control information is located. To improve the scheduling flexibility of a 5G system, scheduled data is located in a number of slots after the downlink control information, and cross-slot scheduling is implemented through configuring a Time Domain Resource Allocation (TDRA) table. The TDRA table is an indication table with a maximum of 16 lines, as shown in Table 1. The first column of the table is an index. The second column is a K0 value, K0 being the slot interval between the PDCCH and PDSCH. For example, when K0 is 1 and the PDCCH is in slot n, then its corresponding PDSCH is in slot n+1. The third column is a mapping type. When the mapping type is A, the mapping is slot-based, i.e., a slot is one scheduling unit, and the PDCCH is always in the first 1, 2, or 3 symbols of a slot. When the mapping type is B, the mapping is mini-slot based, i.e., a plurality of symbols form one scheduling unit, and, depending on the number of symbols in a mini-slot, the starting position of the PDCCH is not limited to the first symbol of the slot. For example, if the length of the mini-slot is 7 symbols, then the PDCCH may be in the first symbol, or may be in the eighth symbol. The fourth column is a start and length indication value (SLIV). The value in this column is used for instructing the location of the starting symbol and the length of consecutive symbols of the PDSCH.

TABLE 1

| Index | K0 | Type | SLIV |
| --- | --- | --- | --- |
| 0 | 0 | A/B | SLIV0 |
| 1 | 1 | A/B | SLIV1 |

TABLE 1-continued

| Index | K0 | Type | SLIV |
|---|---|---|---|
| 2 | 4 | A/B | SLIV2 |
| 3 | 6 | A/B | SLIV3 |
| ... | ... | ... | ... |
| 15 | 32 | A/B | SLIV15 |

From a power saving perspective, cross-slot scheduling enables the terminal equipment to avoid unnecessary caching of PDSCH, and also enables the use of a smaller PDCCH receiver bandwidth, thus reducing power consumption by the terminal equipment. However, in the TDRA table configured for current cross-slot scheduling, a minimum scheduling offset K0min may be equal to 0 or greater than 0. Because the terminal equipment does not know whether K0min for the current slot is greater than or equal to 0, the terminal equipment needs to always keep caching PDSCH. Therefore, in a new version, the minimum scheduling offset K0min is required to be greater than 0 to enable the terminal equipment to remain in the cross-slot scheduling state to save power. As the data in the current slot is indicated by downlink control information in the previous or an earlier slot, it can be known whether the current slot has any data to be received before the current indication arrives. If there is no data to be received, the terminal equipment does not have to receive the PDSCH. However, in the process of continual scheduling of data, setting the minimum scheduling offset K0min to be 0 (i.e., same-slot scheduling) enables the terminal equipment to reach a better performance balance in terms of throughput, offset, and other aspects. Therefore, there is need for switching between K0min being equal to 0 and K0min being greater than 0.

In an illustrative example, when switching from same-slot scheduling to cross-slot scheduling, the terminal equipment will be scheduled with a K0 greater than 0 after the access network equipment sends a switching indication. If the switching indication is not detected by the terminal equipment, the terminal equipment continues to identify that the current K0min is still 0, and the terminal equipment still needs to cache the PDSCH. As a result, the terminal equipment cannot enter into a state in which the PDSCH is not cached, and therefore the power consumption by the terminal equipment is not reduced. However, in this scenario, data scheduling from the access network equipment to the terminal equipment is not affected, so this type of misdetection is considered to be acceptable.

FIG. 1 is a schematic diagram illustrating minimum scheduling offset switching. When switching from cross-slot scheduling to same-slot scheduling, as shown in FIG. 1, the access network equipment schedules the terminal equipment with a K0 greater than 0 in slot n. In slot m, the access network equipment sends a switching indication, which is used for instructing the terminal equipment to switch K0min to 0 in slot m+1, and the access network equipment may schedule the terminal equipment with K0 being 0. If this switching indication is not detected by the terminal equipment, then the terminal equipment continues to identify that the current K0min is greater than 0 and does not start caching the PDSCH in slot m+1. As a result, when the access network equipment schedules the terminal equipment with downlink control information at K0 being 0 in slot m+1, the terminal equipment cannot receive the PDSCH in slot m+1 because the terminal equipment does not cache the PDSCH in slot m+1. In this scenario, the terminal equipment cannot be scheduled, and the throughput performance of the system is therefore affected. Therefore, this type of misdetection is unacceptable.

In the method above, the switching of cross-slot scheduling configuration is indicated by the downlink control information used for data scheduling. Typically, the misdetection rate for this type of downlink control information is relatively high at 1%. When switching from cross-slot scheduling to same-slot scheduling, if the switching indication is not detected by the terminal equipment, the terminal equipment will not enter into a PDSCH caching state and therefore cannot be timely scheduled, which affects the system's throughput performance.

In response to the problem above, the embodiments in this disclosure automatically cause the minimum scheduling offset to switch back to a third minimum value in another switch back period after the switch back period in which the terminal equipment receives the minimum scheduling offset switching indication. This prevents the situation in which the terminal equipment cannot be scheduled due to a misdetection of the switching indication used for instructing a switch-back of the minimum scheduling offset to the third minimum value in relevant technology. Furthermore, this enables the terminal equipment to, after switching back to the third minimum value, cache the PDSCH in the current slot, thus ensuring that the terminal equipment can be timely scheduled and improve the system's throughput performance.

Figure 2:
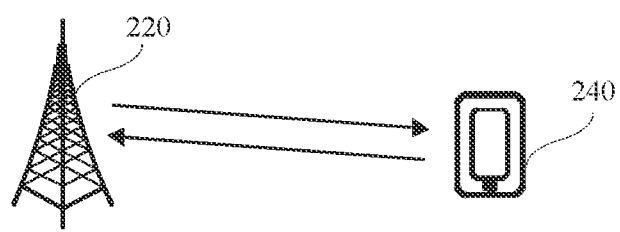
FIG. 2 is a structural diagram illustrating a mobile communication system, according to one exemplary embodiment in the disclosure.

FIG. 2 is a structural diagram illustrating a mobile communication system according to an exemplary embodiment in the disclosure. The mobile communication system may be an LTE system or a 5G system, which is also referred to as a new radio (NR) system. The mobile communication system may also be a future generation of mobile communication technology system beyond 5G. The embodiment does not impose any limitation in this regard.

Optionally, the mobile communication system is configured for various network architectures, including but not limited to a relay network architecture, a dual link architecture, or a vehicle-to-everything (V2X) architecture.

The mobile communication system includes an access network equipment 220 and a terminal equipment 240.

The access network equipment 220 may be a base station (BS), also referred to as base station equipment, which is a device deployed in a radio access network (RAN) to provide wireless communication functions. Examples of equipment that provide base station functions include base transceiver stations (BTS) in 2G networks, Nodes B in 3G networks, evolved Nodes B (eNB) in 4G networks, access points (AP) in wireless local area networks (WLAN), and gNB and ng-eNB in 5G systems. The access network equipment 220 in the embodiment in the disclosure also includes equipment that provides base station functions in new communication systems in the future. The embodiment in the disclosure does not impose limitations on specific implementation of the access network equipment 220. The access network equipment may also include a Home eNB (HeNB), a relay, a Pico, etc.

A base station controller is a device that manages base stations. Examples of base station controllers include base station controllers (BSC) in 2G networks, radio network controllers (RNC) in 3G networks, and devices that control and manage base stations in new communication systems in the future.

A network-side network in the embodiments in the disclosure is a communication network providing communication services to the terminal equipment 240. The network includes a base station of a radio access network and may also include a base station controller of the wireless access network, and may further include equipment on the core network side.

A core network may be an evolved packet core (EPC) network, a 5G Core Network, or a new type of core network in a future communication system. A 5G core network includes a group of equipment and implements access and mobility management functions (AMF) such as mobility management, provides user plane functions (UPF) such as data packet routing and quality of service (QoS), and provides session management functions (SMF), such as session management and IP address assignment and management, and other functions. An EPC may include a Mobility Management Entity (MME) that provides functions such as mobility management and gateway selection, a serving gateway (S-GW) that provides functions such as data packet forwarding, and a Packet Data Network (PDN) gateway (P-GW) that provides functions such as terminal address assignment and rate control.

The access network equipment 220 and the terminal equipment 240 are connected wirelessly by means of a wireless air interface. Optionally, the wireless air interface may be one based on 5G standards. For example, the wireless air interface is New Radio (NR). Alternatively, the wireless air interface may be one that is based on a future generation of 5G-based mobile communication network technology standards. Alternatively, the wireless air interface may also be one that is based on 4G standards (LT system). The access network equipment 220 may receive uplink data sent from the terminal equipment 240 through the wireless connection.

The terminal equipment 240 may refer to equipment that performs data communication with the access network equipment 220. The terminal equipment 240 may communicate with one or a plurality of core networks through a radio access network. The terminal equipment 240 may be user equipment (UE) of various forms, access terminal equipment, a user unit, a user station, a mobile station (MS), a remote station, remote terminal equipment, mobile equipment, user terminal equipment, terminal equipment, wireless communication equipment, a user agent, or a user device. The terminal equipment 240 may also be a cellular phone, a cordless phone, a Session Initiation Protocol (SIP) phone, a Wireless Local Loop (WLL) station, a Personal Digital Assistant (PDA), handheld equipment or computing equipment with wireless communication functions or other processing equipment connected to a wireless modem, in-vehicle equipment, wearable equipment, terminal equipment in a future 5G network, or terminal equipment in a Public Land Mobile Network (PLMN) evolved in the future, etc. The embodiment does not impose any limitation in this regard. The terminal equipment 240 may, through the wireless connection with the access network equipment 220, receive downlink data sent from the access network equipment 220.

It is noted that when the mobile communication system shown in FIG. 2 uses a 5G system or a future generation mobile communication technology system beyond 5G, the network elements above may have different names but provide the same or similar functions in such systems. The embodiment in the disclosure does not impose any limitation in this regard.

It is also noted that the mobile communication system shown in FIG. 2 may include a plurality of access network equipment 220 and/or a plurality of terminal equipment 240. In FIG. 2, one access network equipment 220 and one terminal equipment 240 are shown as an example for purpose of description. The embodiment in the disclosure does not impose any limitation in this regard.

Figure 3:
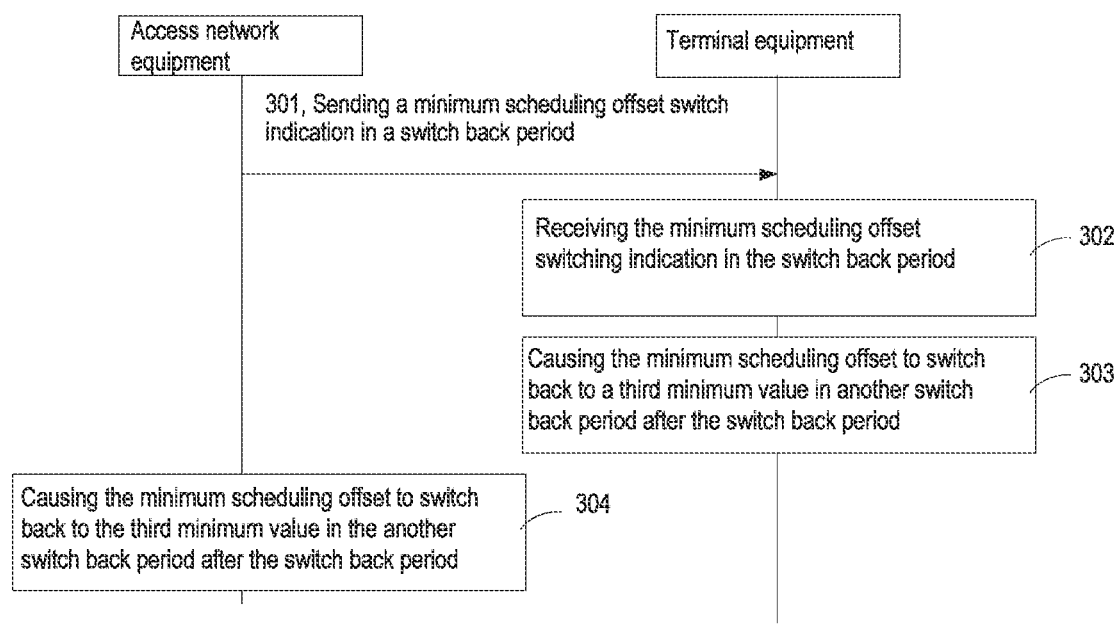
FIG. 3 is a flowchart illustrating a method for instructing a minimum scheduling offset, according to one exemplary embodiment in the disclosure.

FIG. 3 is a flowchart illustrating a method for instructing a minimum scheduling offset according to one exemplary embodiment in the disclosure. This embodiment is directed to the method for using the mobile communication system shown in FIG. 2 as an example. The method comprises the following steps 301, 302, 304, and 304.

In step 301, the access network equipment sends a minimum scheduling offset switching indication in a switch back period.

The switch back period is preconfigured by the access network equipment or is a default value set by the system. When there is no additional switch back period configured by the access network equipment, the switch back period is a default value, i.e., a discontinuous reception cycle (DRX cycle). The embodiment does not impose any limitation in this regard.

In one possible implementation, the switch back period is preconfigured by the access network equipment by setting a timer.

The minimum scheduling offset switching indication is used for instructing the terminal equipment to switch the minimum scheduling offset from a first minimum value to a second minimum value.

Optionally, the minimum scheduling offset switching indication is carried in downlink control information. In other words, the access network equipment sends, within in the switch back period, downlink control information that carries the minimum scheduling offset switching indication.

Optionally, the minimum scheduling offset is a minimum applicable value for scheduling offsets in the TDRA table. Scheduling offset is the interval between the slot in which the terminal equipment receives the downlink control information and the slot in which the PDSCH scheduled by this downlink control information is located.

Optionally, the access network equipment sends the minimum scheduling offset switching indication to the terminal equipment in the switch back period through a downlink channel. For example, the downlink channel is a PDCCH.

Optionally, after the access network equipment sends, in the switch back period, the minimum scheduling offset switching indication to the terminal equipment, the access network equipment switches the minimum scheduling offset from the first minimum value to the second minimum value.

Optionally, after the access network equipment switches the minimum scheduling offset from the first minimum value to the second minimum value, the access network equipment performs scheduling by sending downlink control information that carries a scheduling offset greater than or equal to the second minimum value.

In step 302, the terminal equipment receives the minimum scheduling offset switching indication in the switch back period.

Optionally, the terminal equipment receives the minimum scheduling offset switching indication sent from the access network equipment through the downlink channel. Here, the minimum scheduling offset switching indication is used for instructing the minimum scheduling offset to switch from the first minimum value to the second minimum value.

Optionally, the terminal equipment receives, in the switch back period, the downlink control information that carries the minimum scheduling offset switching indication.

After receiving the minimum scheduling offset switching indication in the switch back period, the terminal equipment switches the minimum scheduling offset from the first minimum value to the second minimum value.

Here, the first minimum value is different from the second minimum value.

Optionally, after switching the minimum scheduling offset from the first minimum value to the second minimum value, the terminal equipment receives the downlink control information, which is sent from the access network equipment, that carries the scheduling offset greater than or equal to the second minimum value.

In step 303, the terminal equipment causes the minimum scheduling offset to switch back to a third minimum value in another switch back period after the switch back period.

In the another switch back period after the switch back period, the terminal equipment causes the minimum scheduling offset to switch back from the second minimum value to the third minimum value. Here, the second minimum value is different from the third minimum value.

Optionally, the third minimum value is a preconfigured value for the minimum scheduling offset after the switch back period. For example, the third minimum value is 0 or 1. The embodiment does not impose any limitation on the specific values of the first minimum value, the second minimum value, and the third minimum value.

Optionally, the another switch back period after the switch back period is the nth switch back period after the switch back period in which the terminal equipment receives the minimum scheduling offset switching indication, n being a positive integer.

Optionally, after causing the minimum scheduling offset to switch back to the third minimum value, the terminal equipment determines that scheduling offsets less than the third minimum value are not applicable. If the third minimum value is zero, the terminal equipment should start caching PDSCH data.

In step 304, the access network equipment causes the minimum scheduling offset to switch back to the third minimum value in the another switch back period after the switch back period.

In the another switch back period after the switch back period, the access network equipment causes the minimum scheduling offset to switch back from the second minimum value to the third minimum value. Here, the second minimum value is different from the third minimum value.

After causing the minimum scheduling offset to switch back to the third minimum value, the access network equipment does not use scheduling offsets less than the third minimum value to schedule data. Optionally, the access network equipment performs scheduling by sending downlink control information that carries a scheduling offset greater than or equal to the third minimum value.

It is noted that step 303 and step 304 may be executed in parallel. Or, step 304 may alternatively be executed before or after step 303. The embodiment does not impose any limitation in this regard.

The embodiments in this disclosure automatically cause the minimum scheduling offset to switch back to the third minimum value in the another switch back period after the switch back period in which the terminal equipment receives the minimum scheduling offset switching indication. This prevents a situation where the terminal equipment cannot be scheduled due to misdetection of the switching indication used for instructing a switch-back of the minimum scheduling offset to the third minimum value in relevant technology. Furthermore, this enables the terminal equipment to, after switching back to the third minimum value, cache the PDSCH in the current slot, thus ensuring that the terminal equipment can be timely scheduled and improve the system's throughput performance.

Figure 4:
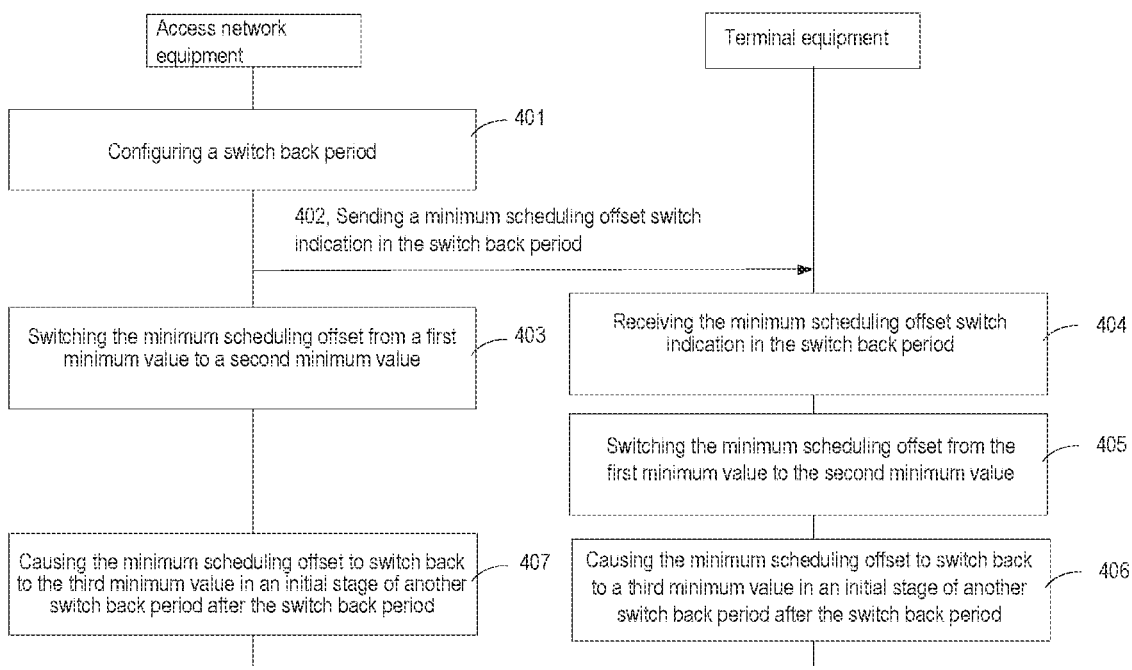
FIG. 4 is a flowchart illustrating a method for instructing a minimum scheduling offset, according to another exemplary embodiment in the disclosure.

FIG. 4 is a flowchart illustrating a method for instructing a minimum scheduling offset according to another exemplary embodiment in the disclosure. This embodiment describes the method using the mobile communication system shown in FIG. 2 as an example. The method comprises the following steps 401, 402, 403, 404, 405, 406, and 407.

In step 401, the access network equipment configures a switch back period.

Optionally, the switch back period is a DRX cycle or is less than the DRX cycle.

Optionally, when the switch back period is less than the DRX cycle, the access network equipment sets a switch back period configuration factor, and determines the number of switch back periods in the DRX cycle and the length of each of the switch back periods based on the DRX cycle and the preset switch back period configuration factor.

In one possible implementation, the access network equipment determines the number of switch back periods in the DRX cycle by using a ceiling function, based on the DRX cycle and the preset switch back period configuration factor.

Optionally, the access network equipment calculates N, the number of switch back periods in the DRX cycle, using the following formula:

$$N = \left\lceil \frac{DRX\ \text{cycle}}{T} \right\rceil$$

Here, DRX cycle is a discontinuous reception cycle, and T is a switch back period configuration factor. The length of each of the first N−1 switch back periods in the DRX cycle is T, and the length of the last switch back period in the DRX cycle is DRX cycle−(N−1)·T.

In one illustrative example, T is 50 ms, and the DRX cycle is 160 ms, so the number of switch back periods can be calculated as:

$$N = \left\lceil \frac{DRX\ \text{cycle}}{T} \right\rceil = \left\lceil \frac{160}{50} \right\rceil = 4,$$

where each of the first three switch back periods is 50 ms, and the fourth switch back period is DRX cycle−(N−1)·T=160−3·50=10 ms.

It is noted that if the access network equipment does not have a switch back period configured, the switch back period takes a default value, i.e., the switch back period is equal to the DRX cycle. If the access network equipment has a switch back period configured, the switch back period is equal to or less than the DRX cycle.

After the access network equipment completes the configuration of the switch back period, it sends the switch back period through high layer signaling. Sending of the switch back period may take the approach of sending the set switch back period configuration factor and DRX cycle configuration to the terminal equipment, or directly sending the number of switch back periods and corresponding length information to the terminal equipment.

Optionally, corresponding to the sending of the configured switch back period through high layer signaling from the access network equipment to the terminal equipment, the terminal equipment receives the switch back period configured by the access network equipment. Illustratively, the high layer signaling includes radio resource control (RRC) layer signaling or media access control (MAC) layer signaling.

In step 402, the access network equipment sends a minimum scheduling offset switching indication in the switch back period.

The access network equipment sends the minimum scheduling offset switching indication to the terminal equipment in the switch back period. Here, the minimum scheduling offset switching indication is used for instructing the terminal equipment to switch the minimum scheduling offset from a first minimum value to a second minimum value.

It is noted that the previous embodiment (FIG. 3) may be referenced for details of the process of the access network equipment sending the minimum scheduling offset switching indication to the terminal equipment in the switch back period, and such details are not repeated herein.

In step 403, the access network equipment switches the minimum scheduling offset from the first minimum value to the second minimum value.

Optionally, the second minimum value is greater than the first minimum value. For example, the first minimum value is 0, and the second minimum value is 1.

In step 404, the terminal equipment receives the minimum scheduling offset switching indication in the switch back period. More particularly, the terminal equipment receives the minimum scheduling offset switching indication sent from the access network equipment in the switch back period.

It is noted that the previous embodiment (FIG. 3) may be referenced for details of the process of the terminal equipment receiving the minimum scheduling offset switching indication sent from the access network equipment in the switch back period, and such details are not repeated herein.

It is also noted that step 403 and step 404 may be executed in parallel. Or, step 404 may alternatively be executed before or after step 403. The embodiment does not impose any limitation in this regard.

In step 405, the terminal equipment switches the minimum scheduling offset from the first minimum value to the second minimum value.

Optionally, the second minimum value is greater than the first minimum value. For example, the first minimum value is 0, and the second minimum value is 1.

After switching the minimum scheduling offset from the first minimum value to the second minimum value, the terminal equipment does not expect to receive any scheduling offset less than the second minimum value. Therefore, in one possible implementation, after sending the minimum scheduling offset switching indication in the switch back period, the access network equipment sends first downlink control information, which carries a scheduling offset less than the second minimum value. Correspondingly, after receiving the first downlink control information, the terminal equipment determines whether the first downlink control information carries a scheduling offset less than the second minimum value. When the terminal equipment determines that the first downlink control information carries a scheduling offset less than the second minimum value, the terminal equipment identifies that this is an error and discards the first downlink control information. For example, after the access network equipment instructs the terminal equipment to switch the current minimum scheduling offset from 0 to 1, if the terminal equipment, upon confirming receipt of this switching indication, still receives downlink control information that instructs a scheduling offset equal to 0, then the terminal equipment should identify that this is erroneous data and discard such data.

In another possible implementation, after sending the minimum scheduling offset switching indication in the switch back period, the access network equipment sends third downlink control information. The third downlink control information carries a scheduling offset greater than or equal to the second minimum value. Correspondingly, after the terminal equipment receives the third downlink control information, when the terminal equipment determines that the third downlink control information carries a scheduling offset greater than or equal to the second minimum value, the terminal equipment executes subsequent scheduled steps according to the third downlink control information.

In step 406, the terminal equipment causes the minimum scheduling offset to switch back to a third minimum value in an initial stage of another switch back period after the switch back period.

Optionally, in the initial stage of the another switch back period after the switch back period, the terminal equipment causes the minimum scheduling offset to switch back from the second minimum value to the third minimum value.

Optionally, the initial stage of the another switch back period after the switch back period is a first slot of the another switch back period after the switch back period.

Optionally, the third minimum value is less than or equal to the first minimum value.

For example, the first minimum value is 0, the second minimum value is greater than 0, and the third minimum value is 0. For another example, the first minimum value is greater than 0, the second minimum value is greater than the first minimum value, and the third minimum value is 0. The embodiment does not impose any limitation on the specific values of the first minimum value, the second minimum value, and the third minimum value.

In an illustrative example, the first minimum value is 0, the second minimum value is 1, and the third minimum value is 0. The terminal equipment receives the minimum scheduling offset switching indication in the switch back period, and switches the minimum scheduling offset from 0 to 1 to implement the switching from same-slot scheduling to cross-slot scheduling. The terminal equipment causes the minimum scheduling offset to switch back from 1 to 0 in the initial stage of one switch back period after the switch back period to implement the switch-back from cross-slot scheduling to same-slot scheduling.

In another illustrative example, the current minimum scheduling offset has already been switched to 1. At this time, the minimum scheduling offset needs to switch from 1 to 2 so that the first minimum value is 1 and the second minimum value is 2. Additionally, the third minimum value is set to 0. The terminal equipment receives the minimum scheduling offset switching indication in the switch back period, and switches the minimum scheduling offset from 1 to 2 to implement the switching of the minimum scheduling offset in a cross-slot scheduling process. The terminal equipment causes the minimum scheduling offset to switch back from 2 to 0 in the initial stage of one switch back period after the switch back period to implement the switch-back from cross-slot scheduling to same-slot scheduling.

In step 407, the access network equipment causes the minimum scheduling offset to switch back to the third minimum value in the initial stage of the one switch back period after the switch back period.

Optionally, in the initial stage of the one switch back period after the switch back period, the access network equipment causes the minimum scheduling offset to switch back from the second minimum value to the third minimum value.

Optionally, the third minimum value is less than or equal to the first minimum value. For example, the first minimum value is 0, and the third minimum value is 0.

It is noted that step 406 and step 407 may be executed in parallel. Or, step 406 may alternatively be executed before or after step 407. The embodiment does not impose any limitation in this regard.

After causing the minimum scheduling offset to switch back to the third minimum value, the terminal equipment does not expect to receive any scheduling offset less than the third minimum value. Therefore, in another possible implementation, the access network equipment sends second downlink control information in an initial stage of the switch back period in which the minimum scheduling offset switches back to the third minimum value. The second downlink control information carries a scheduling offset less than the third minimum value. Correspondingly, after receiving the second downlink control information in the initial stage of the switch back period in which the minimum scheduling offset switches back to the third minimum value, the terminal equipment determines whether the second downlink control information carries a scheduling offset less than the third minimum value. When the terminal equipment determines that the second downlink control information carries a scheduling offset less than the third minimum value, it discards the second downlink control information.

In another possible implementation, the access network equipment sends fourth downlink control information in the another switch back period after the switch back period. The fourth downlink control information carries a scheduling offset greater than or equal to the third minimum value. Correspondingly, the terminal equipment receives the fourth downlink control information. When the terminal equipment determines that the fourth downlink control information carries a scheduling offset greater than or equal to the third minimum value, the terminal equipment executes subsequent scheduled steps according to the fourth downlink control information.

Optionally, the access network equipment sends the fourth downlink control information in the initial stage of the switch back period in which the minimum scheduling offset switches back to the third minimum value.

Figure 5:
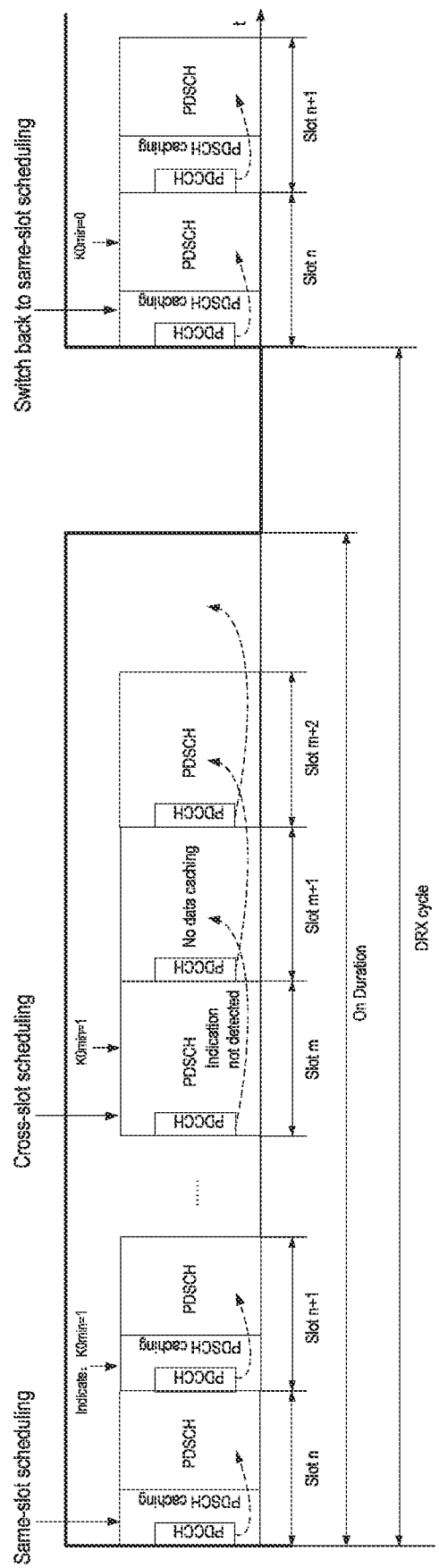
FIG. 5 is a schematic diagram illustrating a method for instructing a minimum scheduling offset, according to one exemplary embodiment in the disclosure.

FIG. 5 is a schematic diagram illustrating a method for instructing a minimum scheduling offset, according to one exemplary embodiment in the disclosure. In an illustrative example, as shown in FIG. 5, a switch back period is a DRX cycle. During a DRX On duration and an inactivity timer of the DRX cycle, the terminal equipment receives the minimum scheduling offset switching indication sent from the access network equipment, and switches the minimum scheduling offset from 0 to 1 to implement the switching from same-slot scheduling to cross-slot scheduling. In an initial stage of the next DRX cycle, the terminal equipment causes the minimum scheduling offset to switch back to 0 to implement the switch-back from cross-slot scheduling to same-slot scheduling.

Figure 6:
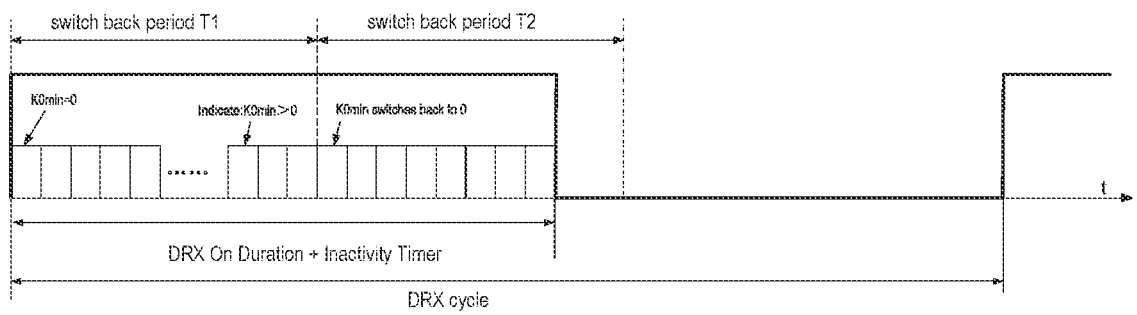
FIG. 6 is a schematic diagram illustrating a method for instructing a minimum scheduling offset, according to another exemplary embodiment in the disclosure.

FIG. 6 is a schematic diagram illustrating a method for instructing a minimum scheduling offset, according to another exemplary embodiment in the disclosure. In another illustrative example shown in FIG. 6, a switch back period is less than the DRX cycle. The terminal equipment receives the minimum scheduling offset switching indication in a switch back period T1, and switches the minimum scheduling offset from 0 to a value greater than 0. The terminal equipment causes the minimum scheduling offset to switch back to 0 in an initial stage of a switch back period T2.

In summary of some embodiments of the present disclosure, after receiving the second downlink control information in the initial stage of the switch back period in which the minimum scheduling offset switches back to the third minimum value, the terminal equipment directly discards the second downlink control information that carries a scheduling offset less than the third minimum value, which the terminal equipment does not expect to receive, thereby further improving the system's throughput performance.

Optionally, the terminal equipment causes the minimum scheduling offset to switch back to the third minimum value in an nth switch back period after the switch back period in which the minimum scheduling offset switching indication is received, n being a positive integer. The value of n may be determined based on the relationship between the slot in which the terminal equipment receives the minimum scheduling offset switching indication and the location of a receiving window.

In one possible implementation, the method includes the following steps before the aforementioned step 402: configuring, by the access network equipment, a receiving window used for transmitting the minimum scheduling offset switching indication, the receiving window being located in the switch back period; sending, by the access network equipment, the configured receiving window through high layer signaling; and, correspondingly, receiving, by the terminal equipment, the receiving window configured by the access network equipment.

Optionally, the access network equipment determines the size of the receiving window based on the length of the switch back period and a preset proportion factor. Illustratively, for each of the switch back periods, the access network equipment multiplies the length of the switch back period and the preset proportion factor to obtain the size of the receiving window in the switch back period.

In an illustrative example, a DRX cycle includes 4 switch back periods, in which each of the first 3 switch back periods is 50 ms, and the fourth switch back period is 10 ms. The proportion factor is 0.5. When the switch back period is 50 ms, the size of the corresponding receiving window is 50×0.5=25 ms. When the switch back period is 10 ms, the size of the corresponding receiving window is 10×0.5=5 ms.

Optionally, the receiving window used for transmitting the minimum scheduling offset switching indication is also referred to as a flip offset value of the switch back period, and the receiving window is located in the switch back period.

Optionally, the receiving window is preconfigured by the access network equipment or is a default value set by the system. The embodiment does not impose any limitation on the approach to set the receiving window.

It is noted that if the access network equipment does not have a receiving window configured for transmitting the minimum scheduling offset switching indication, then the receiving window takes a default value, i.e., the size of the receiving window equals the switch back period. If the access network equipment has a receiving window configured, then the receiver window is located in the switch back period, i.e., the size of the receiving window is equal to or less than the switch back period.

It is also noted that when the switch back period is a DRX cycle, the receiving window is, by default, the DRX cycle. This may alternatively be understood as that the receiving window does not exist, i.e., the behaviors of the terminal equipment and the access network equipment are not affected by the receiving window.

In one possible implementation, when the minimum scheduling offset switching indication is transmitted in the receiving window, i.e., the access network equipment sends the minimum scheduling offset switching indication in the receiving window, the terminal equipment receives the minimum scheduling offset switching indication in the receiving window. The terminal equipment causes the minimum scheduling offset to switch back to a third minimum value in the another switch back period after the switch back period by: causing the minimum scheduling offset to switch back to the third minimum value in an initial stage of a first switch back period after the switch back period.

Optionally, the first switch back period after the switch back period is the immediate next switch back period following the switch back period in which the minimum scheduling offset switching indication is received.

Optionally, the access network equipment sends the fourth downlink control information in the initial stage of the first switch back period after the switch back period. The fourth downlink control information carries a scheduling offset greater than or equal to the third minimum value. Correspondingly, the terminal equipment receives the fourth downlink control information.

Figure 7:
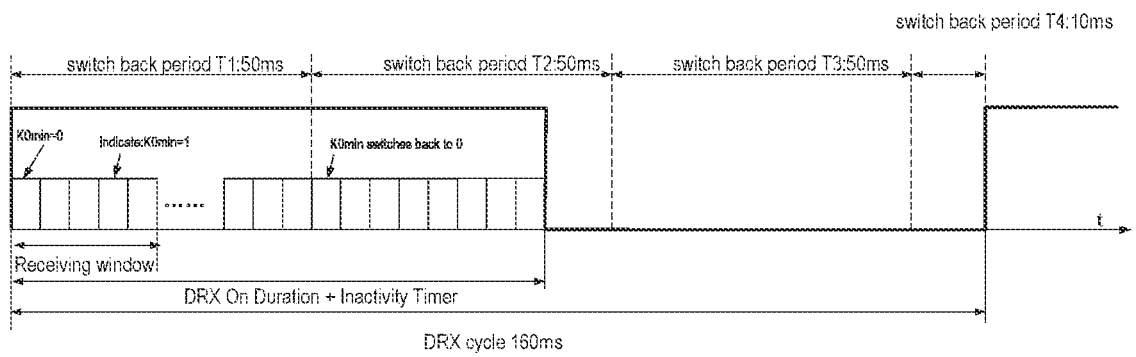
FIG. 7 is a schematic diagram illustrating a method for instructing a minimum scheduling offset, according to another exemplary embodiment in the disclosure.

FIG. 7 is a schematic diagram illustrating a method for instructing a minimum scheduling offset, according to another exemplary embodiment in the disclosure. In an illustrative example shown in FIG. 7, a DRX cycle includes 4 switch back periods, in which each of the first 3 switch back periods (T1 through T3) is 50 ms, and the size of each of their corresponding receiving windows is 25 ms. The fourth switch back period T4 is 10 ms, and the size of its corresponding receiving window is 5 ms. In the first 25 ms of the switch back period T1 (in the receiving window of the switch back period), the terminal equipment receives the minimum scheduling offset switching indication and switches the minimum scheduling offset from 0 to 1. In a first slot of the switch back period T2, the terminal equipment causes the minimum scheduling offset to switch back from 1 to 0.

In another possible implementation, when the minimum scheduling offset switching indication is received outside the receiving window, i.e., the access network equipment sends the minimum scheduling offset switching indication outside the receiving window, the terminal equipment receives the minimum scheduling offset switching indication outside the receiving window.

The terminal equipment causes the minimum scheduling offset to switch back to a third minimum value in another switch back period after the switch back period by: keeping the minimum scheduling offset at the second minimum value in the first switch back period after the switch back period; and causing the minimum scheduling offset to switch back to the third minimum value in an initial stage of a second switch back period after the switch back period.

Figure 8:
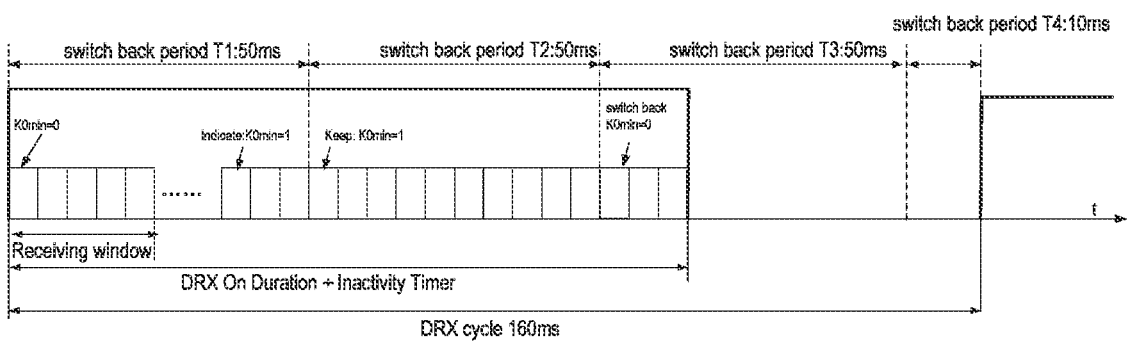
FIG. 8 is a schematic diagram illustrating a method for instructing a minimum scheduling offset, according to another exemplary embodiment in the disclosure.

FIG. 8 is a schematic diagram illustrating a method for instructing a minimum scheduling offset, according to another exemplary embodiment in the disclosure. In another illustrative example shown in FIG. 8, a DRX cycle includes 4 switch back periods, in which each of the first 3 switch back periods (T1 through T3) is 50 ms, and the size of each of their corresponding receiving windows is 25 ms. The fourth switch back period T4 is 10 ms, and the size of its corresponding receiving window is 5 ms. In the last 25 ms of the switch back period T1 (i.e., outside the receiving window of the switch back period), the terminal equipment receives the minimum scheduling offset switching indication and switches the minimum scheduling offset from 0 to 1. In the switch back period T2, the terminal equipment keeps the minimum scheduling offset at 1. In a first slot of the switch back period T3, the terminal equipment causes the minimum scheduling offset to switch back from 1 to 0.

Optionally, the access network equipment sends the fourth downlink control information in the initial stage of the second switch back period after the switch back period. The fourth downlink control information carries a scheduling offset greater than or equal to the third minimum value. Correspondingly, the terminal equipment receives the fourth downlink control information.

In summary of some embodiments of the present disclosure, through the receiving window configured by the access network equipment for transmitting the minimum scheduling offset switching indication, the terminal equipment determines, based on the relationship between the slot in which the terminal equipment receives the minimum scheduling offset switching indication and the location of the receiving window, whether to cause the minimum scheduling offset to switch back to the third minimum value in the initial stage of the first switch back period after the switch back period. This ensures that the terminal equipment can automatically cause the minimum scheduling offset to switch back to the third minimum value and at the same time improves the reasonableness and accuracy of minimum scheduling offset switching.

A device embodiment of the disclosure is described below. Technical details disclosed in the method embodiments above may be referenced for aspects that are not described in detail in the device embodiment.

Figure 9:
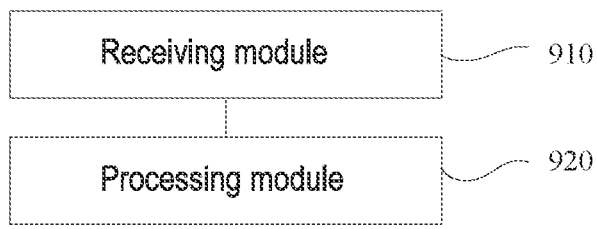
FIG. 9 is a structural diagram illustrating a device for instructing a minimum scheduling offset, according to another embodiment in the disclosure.

FIG. 9 is a structural diagram illustrating a device for instructing a minimum scheduling offset according to another embodiment in the disclosure. The device for instructing a minimum scheduling offset may be implemented through software, hardware, or a combination of both and form the whole or a part of the terminal equipment. The device for instructing a minimum scheduling offset includes a receiving module 910 and a processing module 920.

The receiving module 910 is configured to receive the minimum scheduling offset switching indication in the switch back period. The minimum scheduling offset switching indication is used for instructing the minimum scheduling offset to switch from the first minimum value to the second minimum value.

The processing module 920 is configured to cause the minimum scheduling offset to switch back to the third minimum value in another switch back period after the switch back period.

In one possible implementation, the processing module 920 is further configured to cause the minimum scheduling offset to switch back to the third minimum value in the initial stage of the another switch back period after the switch back period.

In another possible implementation, the second minimum value is greater than the first minimum value, and the third minimum value is less than or equal to the first minimum value.

In another possible implementation, the receiving module 910 is further configured to receive the switch back period configured by the access network equipment.

In another possible implementation, the switch back period is a DRX cycle or is less than the DRX cycle.

In another possible implementation, the receiving module 910 is further configured to receive the receiving window that is configured by the access network equipment for transmitting the minimum scheduling offset switching indication. The receiving window is located in the switch back period.

In another possible implementation, when the minimum scheduling offset switching indication is received in the receiving window, the processing module 920 is further configured to cause the minimum scheduling offset to switch back to the third minimum value in the initial stage of the first switch back period after the switch back period.

In another possible implementation, when the minimum scheduling offset switching indication is received outside the receiving window, the processing module 920 is further configured to keep the minimum scheduling offset at the second minimum value in the first switch back period after the switch back period, and to cause the minimum scheduling offset to switch back to the third minimum value in the initial stage of the second switch back period after the switch back period.

In another possible implementation, the receiving module 910 is further configured to receive the first downlink control information. The processing module 920 is further configured to discard the first downlink control information when the first downlink control information carries a scheduling offset less than the second minimum value.

In another possible implementation, the receiving module 910 is further configured to receive the second downlink control information in the initial stage of the switch back period in which the minimum scheduling offset switches back to the third minimum value. The processing module 920 is further configured to discard the second downlink control information when the second downlink control information carries a scheduling offset less than the third minimum value.

It is noted that, in describing how the device according to the aforementioned embodiment implements its functions, various function modules as divided above are used as examples. In actual applications, the functions above may be assigned to different function modules for completion based on actual needs, i.e., the content and structure of the device are divided into different function modules to complete all or some of the functions described above.

With respect to the device in the aforementioned embodiment, specific approaches that each of the modules employs to execute its operations have been described in detail in the method embodiments, and such detailed descriptions are not repeated in detail herein.

Figure 10:
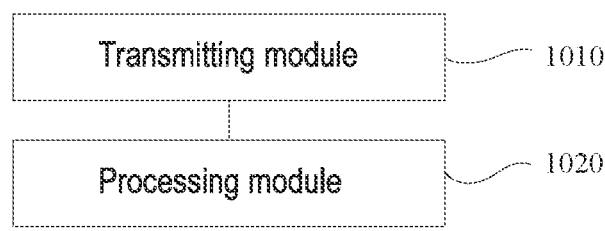
FIG. 10 is a structural diagram illustrating a device for instructing a minimum scheduling offset, according to another embodiment in the disclosure.

FIG. 10 is a structural diagram illustrating a device for instructing a minimum scheduling offset according to another embodiment in the disclosure. The device for instructing a minimum scheduling offset may be implemented through software, hardware, or a combination of both and form the whole or a part of the access network equipment. The device for instructing a minimum scheduling offset includes a transmitting module 1010 and a processing module 1020.

The transmitting module 1010 is configured to send the minimum scheduling offset switching indication in the switch back period. The minimum scheduling offset switching indication is configured to instruct the terminal equipment to switch the minimum scheduling offset from the first minimum value to the second minimum value. The processing module 1020 is configured to cause the minimum scheduling offset to switch back to the third minimum value in the another switch back period after the switch back period.

In one possible implementation, the processing module 1020 is further configured to cause the minimum scheduling offset to switch back to the third minimum value in the initial stage of the another switch back period after the switch back period.

In another possible implementation, the second minimum value is greater than the first minimum value, and the third minimum value is less than or equal to the first minimum value.

In another possible implementation, the transmitting module 1010 is further configured to send the configured switch back period through high layer signaling.

In another possible implementation, the switch back period is a DRX cycle or is less than the DRX cycle.

In another possible implementation, the processing module 1020 is further configured to determine, when the switch back period is less than the DRX cycle, the number of switch back periods in the DRX cycle and the length of each of the switch back periods, based on DRX cycle and the preset switch back period configuration factor.

In another possible implementation, the transmitting module 1010 is further configured to send, through high layer signaling, the configured receiving window for transmitting the minimum scheduling offset switching indication. The receiving window is located in the switch back period.

In another possible implementation, the processing module 1020 is further configured to determine the size of the receiving window based on the length of the switch back period and a preset proportion factor.

In another possible implementation, the transmitting module 1010 is further configured to send the third downlink control information, which carries a scheduling offset greater than or equal to the second minimum value.

In another possible implementation, the transmitting module 1010 is further configured to send the fourth downlink control information in the another switch back period after the switch back period. The fourth downlink control information carries a scheduling offset greater than or equal to the third minimum value.

In another possible implementation, when the minimum scheduling offset switching indication is sent in the receiving window, the transmitting module 1010 is further configured to send the fourth downlink control information in the initial stage of the first switch back period after the switch back period.

In another possible implementation, when the minimum scheduling offset switching indication is sent outside the receiving window, the transmitting module 1010 is further configured to send the fourth downlink control information in the initial stage of the second switch back period after the switch back period.

It is noted that, in describing how the device according to the aforementioned embodiment implements its functions, various function modules as divided above are used as examples. In actual applications, the functions above may be assigned to different function modules for completion based on actual needs, i.e., the content and structure of the device are divided into different function modules to complete all or some of the functions described above.

With respect to the device in the aforementioned embodiment, specific approaches that each of the modules employs to execute its operations have been described in detail in the method embodiments, and such detailed descriptions are not repeated in detail herein.

Figure 11:
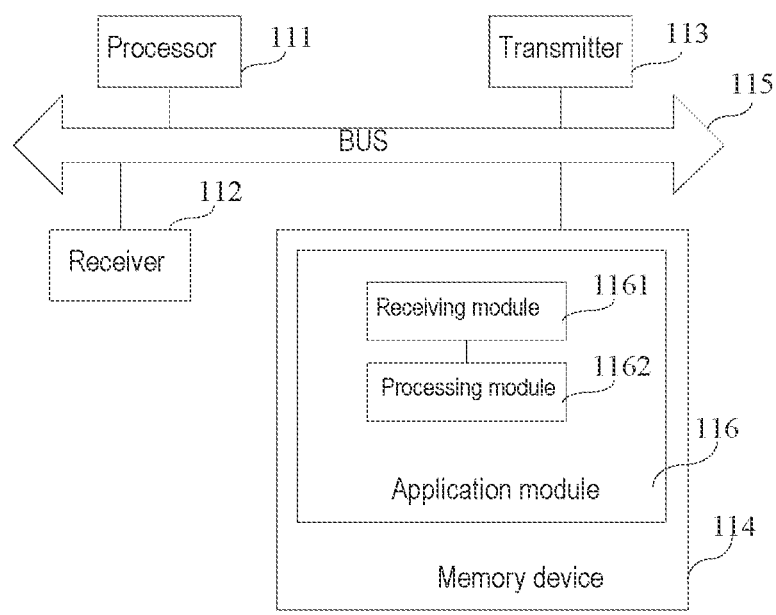
FIG. 11 is a structural diagram illustrating terminal equipment, according to one exemplary embodiment in the disclosure.

FIG. 11 is a structural diagram illustrating terminal equipment according to one exemplary embodiment in the disclosure. The terminal equipment may be the terminal equipment 240 in the mobile communication system shown in FIG. 2. For illustrative purposes, the terminal equipment in this embodiment is a UE in an LTE system or 5G system. This terminal equipment includes: a processor 111, a receiver 112, a transmitter 113, a memory device 114, and a bus 115. The memory device 114 is connected to the processor 111 through the bus 115.

The processor 111 includes one or more processing cores and, by running software programs and modules, executes various functional applications and information processing.

The receiver 112 and the transmitter 113 may be implemented as one communication component. This communication component may be a communication chip, which may include a receiving module, a transmitting module, and a modem module configured to modulate and/or demodulate information and receive or send the information through wireless signals.

The memory device 114 may be configured to store executable instructions for the processor 111.

The memory device 114 stores an application module 116 of at least one function above described. The application module 116 includes a receiving module 1161 application and a processing module 1162 application.

The processor 111 is configured to execute the receiving module 1161 application through the receiver 112 to implement functions in relevant receiving steps of the aforementioned method embodiments. The processor 111 is further configured to execute the processing module 1162 application to implement functions in relevant processing steps in the aforementioned method embodiments.

Moreover, the memory device 114 may be implemented as a volatile or non-volatile memory equipment of any type; such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk; or a combination thereof.

Figure 12:
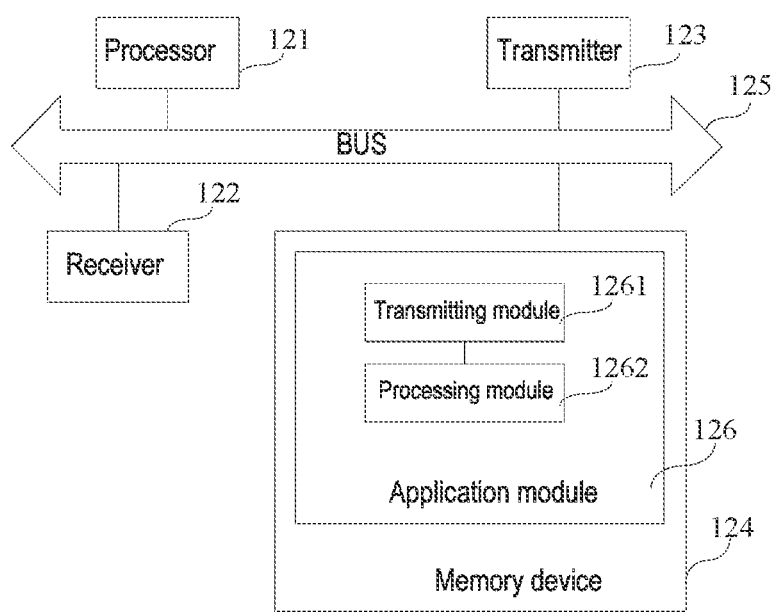
FIG. 12 is a structural diagram illustrating access network equipment, according to one exemplary embodiment in the disclosure.

FIG. 12 is a structural diagram illustrating access network equipment according to one exemplary embodiment in the disclosure. The access network equipment may be the access network equipment 220 in the implementation environment shown in FIG. 2. For illustrative purposes, the access network equipment in this embodiment is an eNB in an LTE system or a gNB in a 5G system. This access network equipment includes a processor 121, a receiver 122, a transmitter 123, a memory device 124, and a bus 125. The memory device 124 is connected to the processor 121 through the bus 125.

The processor 121 includes one or more processing cores and, by running software programs and modules, executes various functional applications and information processing.

The receiver 122 and the transmitter 123 may be implemented as one communication component. This communication component may be a communication chip, which may include a receiving module, a transmitting module, and a modem module configured to modulate and/or demodulate information and receive or send the information through wireless signals.

The memory device 124 may be configured to store executable instructions for the processor 121.

The memory device 124 stores an application module 126 of at least one function. The application module 126 may include a transmitting module 1261 application and a processing module 1262 application.

The processor 121 is configured to execute the transmitting module 1261 application through the transmitter 123 to implement functions in relevant sending steps of the aforementioned method embodiments. The processor 121 is further configured to execute the processing module 1262 application to implement functions in relevant processing steps in the aforementioned method embodiments.

Moreover, the memory device 124 may be implemented as a volatile or non-volatile memory equipment of any type; such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk; or a combination thereof.

One embodiment in the disclosure further provides a system for instructing a minimum scheduling offset. The system includes terminal equipment and access network equipment.

In one possible implementation, the terminal equipment includes the device for instructing a minimum scheduling offset as shown in FIG. 9 above, and the access network equipment includes the devise for instructing a minimum scheduling offset as shown in FIG. 10 above.

In another possible implementation, the terminal equipment includes the terminal equipment as shown in FIG. 11 above, and the access network equipment includes the access network equipment as shown in FIG. 12 above.

The disclosure may be a system, a method, and/or a computer program product. The computer program product may include a computer readable storage medium that that stores a set of computer program instructions for causing a processor to implement various aspects of the disclosure.

The computer readable storage medium may be a tangible equipment capable of keeping and storing instructions used by instruction-executing equipment. The computer readable storage medium may be, for example, but is not limited to, an electrical memory equipment, a magnetic memory equipment, an optical memory equipment, an electromagnetic memory equipment, a semiconductor memory equipment, or any suitable combination thereof. More specific examples (a non-exhaustive list) of computer readable storage media include: portable computer disks, hard disks, random access memories (RAMs), read-only memories (ROMs), erasable programmable read-only memories (EPROMs or flash memories), static random-access memories (SRAMs), compact disc read-only memories (CD-ROMs), digital versatile disks (DVDs), memory sticks, floppy disks, mechanical coding equipment (such as punch cards or raised structures in grooves on which an instruction are stored), and any suitable combination thereof. The computer readable storage medium used here is not to be interpreted as transient signals themselves, such as radio waves, other electromagnetic waves freely propagated, other electromagnetic waves propagated through waveguides or other propagation media (for example, optical pulses through fiber optic cables), or other electrical signals transmitted through electrical wires.

The computer readable program instruction described here may be downloaded from the computer readable storage medium to various computing/processing equipment; or downloaded from a network, such as the Internet, a local area network (LAN), a wide area network (WAN), and/or a Wi-Fi network, to an external computer or an external memory equipment. The network may comprise a copper transmission cable, fiber optic transmission, wireless transmission, a router, a firewall, a switch, a gateway computer, and/or an edge server. A network adapter card or a network interface in each computing/processing equipment receives a computer readable program instruction from the network, and forwards the computer readable program instruction to be stored in a computer readable storage medium in a computing/processing equipment.

The computer program instruction for executing operations of the disclosure may be an assembly instruction, an instruction set architecture (ISA) instruction, a machine instruction, a machine related instruction, microcode, a firmware instruction, state setting data, or source code or object code written in one or any combination of a plurality of programming languages; the programming languages comprises an object-oriented programming language (such as Smalltalk and C++), a common procedural programming language (such as "C"), or a similar programming language. The computer readable program instruction may be executed entirely on a user computer, partially on a user computer, as a standalone software package, partially on a user computer and partially on a remote computer, or entirely on a remote computer or server. When a remote computer is involved, the remote computer may be connected to a user computer through a network of any type, including a LAN network or a WAN network; or, may be connected to an external computer (for example, connected through the Internet by using an Internet service provider). In some embodiments, an electrical circuit is customized by state information of a computer readable program instruction; such an electrical circuit may be a programmable logic circuit, a field programmable gate array (FPGA), or a programmable logic array (PLA); and the electrical circuit may execute a computer readable program instruction to implement various aspects in the disclosure.

This document describes various aspects in the disclosure in reference to flowcharts and/or block diagrams of the methods, devices (systems), and computer program products in the embodiments in the disclosure. It should be understood that each block in the flowcharts and/or block diagrams and combinations of the blocks in the flowcharts and/or block diagrams may be implemented by computer readable program instructions.

These computer readable program instructions may be provided to a processor of a general purpose computer, a special purpose computer, or another programmable data processing device to produce a machine so as to create, when these instructions are executed by the processor of the computer or the other programmable data processing device, a device that implements functions/actions specified in one or a plurality of blocks in the flowcharts and/or block diagrams. These computer readable program instructions may also be stored in a computer readable storage medium, and these instructions cause a computer, a programmable data processing device, and/or another equipment to work in a certain way. Thus, the computer readable medium that stores the instructions comprises a manufacture, which comprises instructions for implementing various aspects of functions/actions specified in one or a plurality of blocks in the flowcharts and/or block diagrams.

The computer readable program instructions may also be loaded to a computer, another programmable data processing device, or another equipment so that a series of operative steps are executed on the computer, the other programmable data processing device, or the other equipment to create a process of computer implementation, thereby causing functions/actions specified in one or a plurality of blocks in the flowcharts and/or block diagrams to be implemented by the instructions executed on the computer, the other programmable data processing device, or the other equipment.

The flowcharts and block diagrams in the drawings illustrate system architectures, functions, and operations that may be implemented by the systems, methods, and computer program products based on a plurality of embodiments in the disclosure. In this regard, each block in the flowcharts or block diagrams may represent a part of a module, a program segment, or an instruction; the part of module, program segment, or the instruction contains one or a plurality of executable instructions for implementing specified logical functions. In some alternative implementations, functions marked in the blocks may, alternatively, occur in an order different from that marked in the drawings. For example, depending on the functions involved, two consecutive blocks may, in fact, be executed in an essentially parallel way, and sometimes they may, alternatively, be executed in a reverse order. It is also noted that each block in the block diagrams and/or flowcharts and combinations of the blocks in the block diagrams and/or flowcharts may be implemented by a special purpose hardware-based system that executes specified functions or actions, or by a combination of special purpose hardware and computer instructions.

With respect to the embodiments in the disclosure described above, the descriptions are exemplary and not exhaustive, and are not limited to the disclosed embodiments. Without deviating from the scope and spirit of the embodiments described, many modifications and changes are evident for persons of ordinary skill in the art. Terminology choices in this document are meant to best explain the principles and practical applications of the embodiments or technical improvements of technologies in the market, or to enable other persons of ordinary skill in the art to understand the embodiments disclosed in this document.

What is claimed is:

1. A method, applied in terminal equipment, for instructing a minimum scheduling offset, the method comprising:
   in a switch back period, receiving a minimum scheduling offset switching indication, the minimum scheduling offset switching indication to instruct switching the minimum scheduling offset from a first minimum value to a second minimum value;
   after receiving the minimum scheduling offset switching indication in the switch back period:
   receiving downlink control information; and
   discarding downlink control information when the downlink control information carries a scheduling offset less than the second minimum value; and
   causing the minimum scheduling offset to switch back to a third minimum value in another switch back period after the switch back period.

2. The method of claim 1, wherein the causing the minimum scheduling offset to switch back to the third minimum value in another switch back period after the switch back period comprises:
   causing the minimum scheduling offset to switch back to the third minimum value in an initial stage of the another switch back period after the switch back period.

3. The method of claim 1, wherein the second minimum value is greater than the first minimum value, and the third minimum value is less than or equal to the first minimum value.

4. The method of claim 1, further comprising:
before receiving the minimum scheduling offset switching indication in the switch back period, receiving the switch back period configured by an access network equipment.

5. The method of claim 4, wherein the switch back period is a discontinuous reception (DRX) cycle or is less than the DRX cycle.

6. The method of claim 1, further comprising:
before receiving the minimum scheduling offset switching indication in the switch back period, receiving a receiving window configured by an access network equipment for transmitting the minimum scheduling offset switching indication, the receiving window being located in the switch back period.

7. The method of claim 6, wherein, when the minimum scheduling offset switching indication is received in the receiving window, causing the minimum scheduling offset to switch back to the third minimum value in the another switch back period after the switch back period comprises:
causing the minimum scheduling offset to switch back to the third minimum value in an initial stage of a first switch back period after the switch back period.

8. The method of claim 6, wherein, when the minimum scheduling offset switching indication is received outside the receiving window, the causing the minimum scheduling offset to switch back to the third minimum value in the another switch back period after the switch back period comprises:
keeping the minimum scheduling offset at the second minimum value in a first switch back period after the switch back period; and
causing the minimum scheduling offset to switch back to the third minimum value in an initial stage of a second switch back period after the switch back period.

9. The method of claim 1, further comprising:
after receiving the minimum scheduling offset switching indication in the switch back period:
receiving the downlink control information in an initial stage of the switch back period in which the minimum scheduling offset switches back to the third minimum value; and
discarding the downlink control information when the downlink control information carries the scheduling offset less than the third minimum value.

10. A device, applied in terminal equipment, for instructing a minimum scheduling offset, the device comprising:
a receiver configured to receive a minimum scheduling offset switching indication in a switch back period and receive downlink control information after receiving the minimum scheduling offset switching indication in the switch back period, the minimum scheduling offset switching indication to instruct switching the minimum scheduling offset from a first minimum value to a second minimum value; and
a processor configured to discard the downlink control information when the downlink control information carries a scheduling offset less than the second minimum value, and to cause the minimum scheduling offset to switch back to a third minimum value in another switch back period after the switch back period.

11. The device of claim 10, wherein the processor is configured to cause the minimum scheduling offset to switch back to the third minimum value in another switch back period after the switch back period by:
causing the minimum scheduling offset to switch back to the third minimum value in an initial stage of the another switch back period after the switch back period.

12. The device of claim 10, wherein the second minimum value is greater than the first minimum value, and the third minimum value is less than or equal to the first minimum value.

13. The device of claim 10, wherein the receiver is further configured to, before receiving the minimum scheduling offset switching indication in the switch back period, receive the switch back period configured by an access network equipment.

14. The device of claim 13, wherein the switch back period is a discontinuous reception (DRX) cycle or is less than the DRX cycle.

15. The device of claim 10, wherein the receiver is further configured to, before receiving the minimum scheduling offset switching indication in the switch back period, receive a receiving window configured by an access network equipment for transmitting the minimum scheduling offset switching indication, the receiving window being located in the switch back period.

16. The device of claim 15, wherein, when the minimum scheduling offset switching indication is received in the receiving window, the processor is configured to cause the minimum scheduling offset to switch back to the third minimum value in the another switch back period after the switch back period by:
causing the minimum scheduling offset to switch back to the third minimum value in an initial stage of a first switch back period after the switch back period.

17. The device of claim 15, wherein, when the minimum scheduling offset switching indication is received outside the receiving window, the processor is configured to cause the minimum scheduling offset to switch back to the third minimum value in the another switch back period after the switch back period by:
keeping the minimum scheduling offset at the second minimum value in a first switch back period after the switch back period; and
causing the minimum scheduling offset to switch back to the third minimum value in an initial stage of a second switch back period after the switch back period.

18. Terminal equipment, comprising:
a processor; and
a memory device configured to store instructions executable by the processor;
wherein the processor is configured to execute the instructions to:
receive a minimum scheduling offset switching indication in a switch back period, the minimum scheduling offset switching indication to instruct switching a minimum scheduling offset from a first minimum value to a second minimum value;
after receiving the minimum scheduling offset switching indication in the switch back period:
receive downlink control information; and
discard downlink control information when the downlink control information carries a scheduling offset less than the second minimum value; and
cause the minimum scheduling offset to switch back to a third minimum value in another switch back period after the switch back period.

19. Terminal equipment of claim 18, wherein the processor is further configured to execute the instructions to cause the minimum scheduling offset to switch back to the third minimum value in another switch back period after the switch back period by:
    causing the minimum scheduling offset to switch back to the third minimum value in an initial stage of the another switch back period after the switch back period.

* * * * *